J. P. White.
Burglar Proof Safe.
No. 95,059. Patented Sept. 21, 1869.

Witnesses.
Gustave Dieterich
O. Hinchman

Inventor.
J. P. White
per _____ 
Attorneys

United States Patent Office.

JOSEPH P. WHITE, OF SAVANNAH, GEORGIA.

Letters Patent No. 95,059, dated September 21, 1869.

IMPROVEMENT IN SAFES.

The Schedule referred to in these Letters Patent and making part of the same.

*To all whom it may concern:*

Be it known that I, JOSEPH P. WHITE, of Savannah, in the county of Chatham, and State of Georgia, have invented a new and improved Safe; and I do hereby declare that the following is a full, clear, and exact description thereof, which will enable others skilled in the art to make and use the same, reference being had to the accompanying drawings, forming part of this specification.

This invention relates to improvements in safes such as are designed for protection against fire and burglars, having for its object to provide greater protection against burglars than exists in the safes now constructed.

The invention consists in constructing the safe of an inner thick and strong shell of metal, and an exterior thin shell of chilled iron, and having on its interior surface flint, emery, or any other substance which in drilling will generate sparks of fire to explode powder, with which a space between the two shells is to be filled, so as to blow off the outer shell, to create alarm, and to disable the burglars.

Similar letters of reference indicate corresponding parts.

Figure 1:
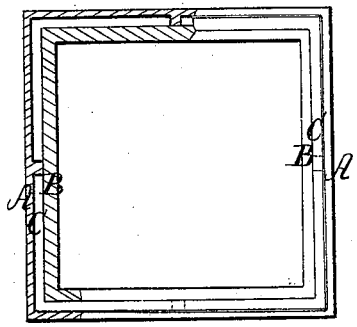
Figure 1 represents a top view, with a part broken away.
Figure 2:
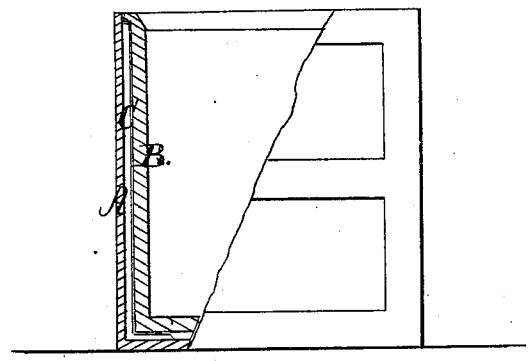
Figure 2 represents a similar side elevation.

I propose to construct these safes of two shells, A B, the outer one, A, being thin, and made of cast-metal, so as to break into fragments when exposed to great strain, and the inner shell B, being made thicker and stronger, and preferably of more tough and fibrous material.

These shells are to be so designed, relatively to each other, in respect of size, as to provide a space, C, on all sides, which space I propose to fill with gunpowder. I also propose to coat the interior surface of the outer shell, in casting or by any other means, with flint, broken glass, emery, or any other substance which will, under the action of a drill in boring, generate fire to explode the powder, and thus create an alarm, and disable the burglars, by exploding the outer shell and throwing the fragments in all directions from all sides of the safe.

I propose to make the inner shell sufficiently thick and strong to withstand this explosion.

These shells may be cast so as to form the five sides in one piece, or they may be made in any other preferred way.

The door may also be made of two walls with a space between, similarly charged.

The powder being enclosed in an air-tight space will not explode in case of the burning of the buildings containing the safes, but will burn without exploding in case the heat is very great.

Having thus described my invention,

I claim as new, and desire to secure by Letters Patent—

A safe made with strong interior shell, B, and thin exterior shell, A, arranged with a space between them, filled with explosive powder, and a rough substance, which, by frictional contact with a burglar's tool, will ignite the powder, substantially as described.

JOSEPH P. WHITE.

Witnesses:
JAS. S. HAUPT,
B. B. FERRILL.